(12) United States Patent
Chiu (10) Patent No.: US 11,910,951 B2
(45) Date of Patent: Feb. 27, 2024

(54) COOKING DEVICE FOR FOOD

(71) Applicant: Yung Ching Chiu, Kaohsiung (TW)

(72) Inventor: Yung Ching Chiu, Kaohsiung (TW)

( * ) Notice: Subject to any disclaimer, the term of this patent is extended or adjusted under 35 U.S.C. 154(b) by 386 days.

(21) Appl. No.: 16/728,737

(22) Filed: Dec. 27, 2019

(65) Prior Publication Data

US 2021/0161324 A1 Jun. 3, 2021

(30) Foreign Application Priority Data

Dec. 27, 2018 (TW) ................. 107147502

(51) Int. Cl.
| | |
|---|---|
| A47J 29/06 | (2006.01) |
| A47J 27/04 | (2006.01) |
| A47J 27/16 | (2006.01) |
| A47J 27/18 | (2006.01) |
| A47J 29/02 | (2006.01) |

(52) U.S. Cl.
CPC ............... *A47J 29/06* (2013.01); *A47J 27/04* (2013.01); *A47J 27/16* (2013.01); *A47J 27/18* (2013.01); *A47J 29/02* (2013.01); *A47J 2027/043* (2013.01)

(58) Field of Classification Search
None
See application file for complete search history.

(56) References Cited

U.S. PATENT DOCUMENTS 5,666,876 A * 9/1997 Vos .......................... A23L 1/01
99/443

FOREIGN PATENT DOCUMENTS

| CN | 1437446 A | * | 8/2003 | ............ A23L 7/109 |
| CN | 104398148 A | | 3/2015 | |
| CN | 108670018 A | * | 10/2018 | ............ A47J 27/16 |
| DE | 19944552 A1 | * | 3/2001 | ............ A47J 29/02 |
| EP | 0317349 A2 | * | 5/1989 | ............ A47J 29/00 |
| KR | 20110011311 A | * | 2/2011 | ............ A47J 27/14 |
| KR | 20180082870 A | * | 7/2018 | ............ A01K 43/00 |
| WO | WO 2015186156 A1 | * | 12/2015 | ............ A23L 7/109 |
| WO | WO 2016030906 A1 | * | 3/2016 | ............ A47J 19/00 |

OTHER PUBLICATIONS

Machine translation of WO 2015186156 A1 performed on Jul. 6, 2022, Hibi et al. (Year: 2015).*
Machine translation of CN 1437446 A performed on Jul. 6, 2022, Sakurazawa (Year: 2003).*

(Continued)

*Primary Examiner* — Dana Ross
*Assistant Examiner* — Kevin Guanhua Wen
(74) *Attorney, Agent, or Firm* — WPAT, P.C (57) ABSTRACT

The present disclosure is relates to a cooking device for food. The cooking device includes a base, a power unit and a multi-stage cooking unit. The base has an inlet end and an outlet end. The power unit is connected to the base. The power unit has a first driving member and a second driving member. The multi-stage cooking unit is divided into an upper layer and a lower layer, and has a plurality of stoppers and at least one guideway. The stoppers pivotally are connected to the second driving members. The at least one guideway is connected to the base, the stoppers pivotally move to form a carrying spacing or a blanking spacing, and near the outlet end the stoppers pivotally move to output the cooked food.

12 Claims, 10 Drawing Sheets

(56) References Cited

OTHER PUBLICATIONS

Machine translation of KR 20110011311 A performed on Jul. 6, 2022, Kitagawa (Year: 2011).*
Machine translation of CN 108670018 A performed on Jul. 7, 2022, Zhao (Year: 2018).*
Machine translation of KR 20180082870 A performed on Jul. 7, 2022, Hong (Year: 2018).*
Machine translation of DE 19944552 A1 performed on Dec. 22, 2022, Bergmeier (Year: 2001).*
Office Action, Cited Reference (CN104398148A) and Search Report (search report alone dated Jul. 9, 2019) dated Jul. 10, 2019 issued by the Taiwan Intellectual Property Office for the corresponding TW patent application No. 107147502.
Notice of Allowance dated Dec. 11, 2019 issued by the Taiwan Intellectual Property Office for the corresponding TW patent application No. 107147502.
English Abstract of CN104398148A.
English Translation of the Search Report dated Jul. 9, 2019 issued by the Taiwan Intellectual Property Office for the corresponding TW patent application No. 107147502.
Office Action, Cited Reference (CN104398148A) and Search Report (search report alone dated Dec. 9, 2020) dated Dec. 15, 2020 issued by the China National Intellectual Property Administration for the corresponding Chinese Patent Application No. 201911099271.6.
English Translation of the Search Report dated Dec. 9, 2020 issued by the China National Intellectual Property Administration for the corresponding Chinese Patent Application No. 201911099271.6.
Notice of Allowance dated Feb. 24, 2021 issued by the Japan Patent Office for the corresponding Japanese Patent Application No. 2019-239048.

* cited by examiner

COOKING DEVICE FOR FOOD

FIELD

The disclosure relates to a cooking device for food.

BACKGROUND

Steaming or boiling is a simple cooking method for food, which can quickly heat the food to be fully cooked for eating. However, for food of different characteristics, only corresponding preferred heating and cooking methods can present unique tastes and flavors of the food.

For example, as common food in daily life, eggs have very high nutritional value. For a general catering market, a large number of boiled eggs need to be cooked every day to cater for customers. Therefore, there is a conventional egg boiling device on the market, which can produce a large number of eggs in batches to meet market demand. However, in a process of using the conventional egg boiling device to cook a large number of eggs, because many eggs are processed in a batch, the eggs are easily squeezed against each other and cracked, which easily causes a loss to the owner. In addition, it is difficult to effectively control the quality of the boiled eggs in the cooking process. For example, the yolk is eccentric or the boiled egg may not be cooked evenly during cooking. Moreover, the conventional egg boiling device has a large overall volume and easily occupies too much space of the workshop; therefore, it is inconvenient to use the device.

SUMMARY OF THE INVENTION

In accordance with one aspect of the present disclosure, a cooking device for food includes a base, a power unit and a multi-stage cooking unit. The base has an inlet end and an outlet end, and an accommodating space is formed between the inlet end and the outlet end. A transmission direction is defined between the inlet end and the outlet end, a direction from the inlet end to the outlet end is defined as a first transmission direction, and a direction from the outlet end to the inlet end is defined as a second transmission direction. The power unit is connected to the base. The power unit has a first driving member and a second driving member, the first driving member and the second driving member each have a plurality of rotation shafts, a plurality of sprockets, and a plurality of chains. The rotation shafts rotatably are connected to the base and located in the accommodating space, the sprockets are connected to the rotation shafts respectively, and the chains are mounted around the sprockets. A first vertical height exists between one of the rotation shafts that is near the inlet end and a bottom portion of the base, and a second vertical height exists between another rotation shaft that is near the outlet end and the bottom portion of the base, the first vertical height is less than the second vertical height. The multi-stage cooking unit is divided into an upper layer and a lower layer. The multi-stage cooking unit has a plurality of stoppers and at least one guideway. The stoppers pivotally are connected to the second driving members of the power unit. The stoppers of the upper layer are driven by the second driving member to move towards the second transmission direction, the stoppers of the lower layer are driven by the second driving member to move towards the first transmission direction. The at least one guideway is connected to the base, wherein the stoppers pivotally move to form a carrying spacing or a blanking spacing, and near the outlet end the stoppers pivotally move to output the cooked food.

Therefore, in the process that the cooking device uses the multi-stage cooking unit to cook food, the food may be arranged at intervals, to effectively prevent each of the food from being cracked due to squeeze. In addition, because the multi-stage cooking unit can be divided into the upper layer and the lower layer by using the hierarchical design, an overall length of the cooking device for food is reduced to avoid occupying too much space of the workshop. Further, the cooking device for food of the invention can be used to cook a large quantity of food, and can steadily drive food to keep moving, so that the food has enough time to be fully cooked evenly, to improve the cooking quality of the food.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
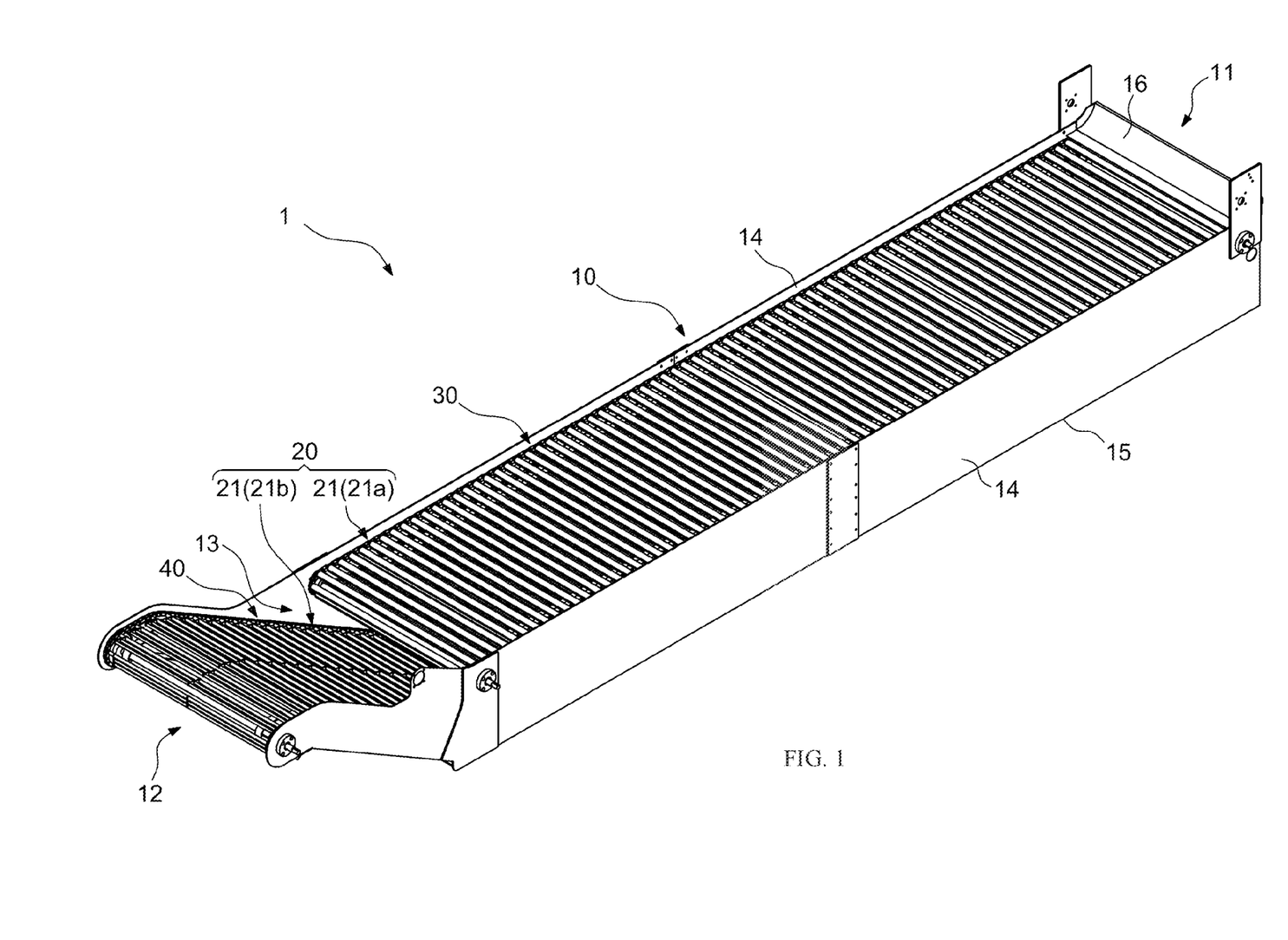
FIG. 1 is a three-dimensional appearance diagram of a cooking device for food according to the invention.
Figure 2A:
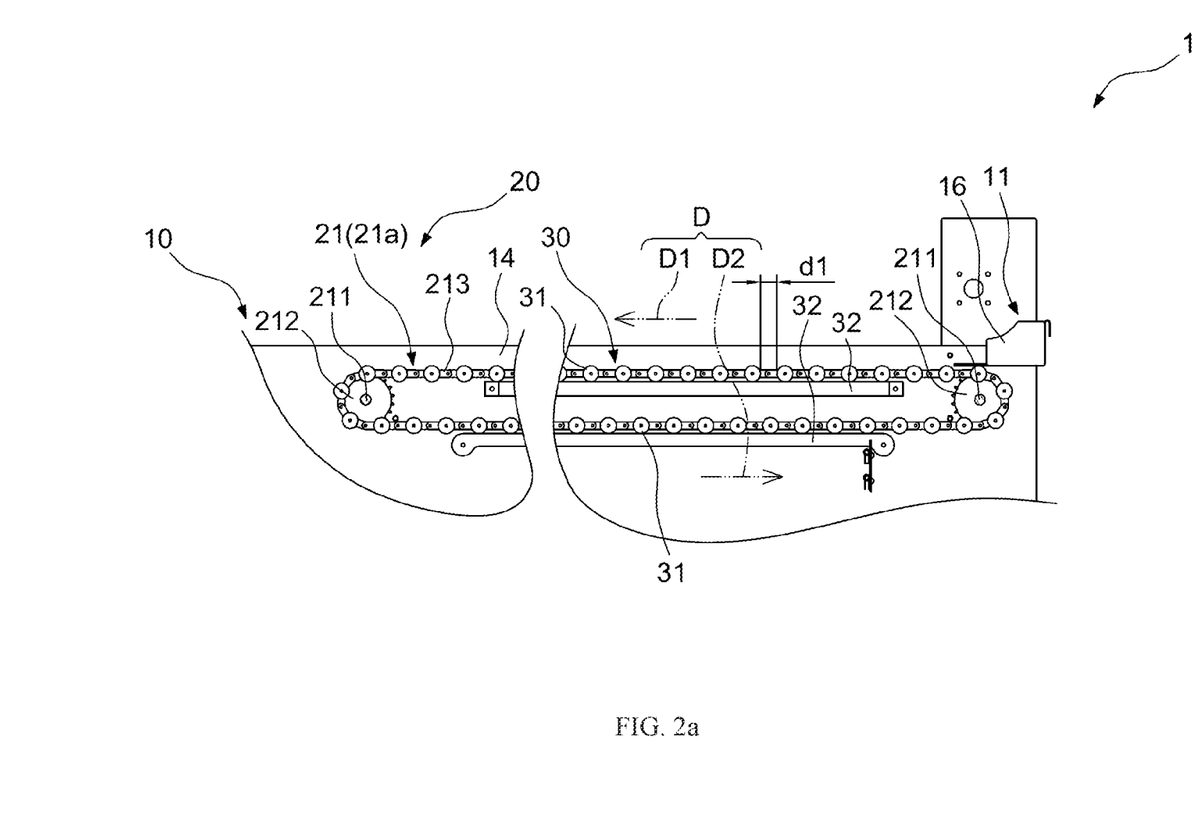
FIG. 2a is a local side cross-sectional view of an upper section of the cooking device for food according to the invention.
Figure 2B:
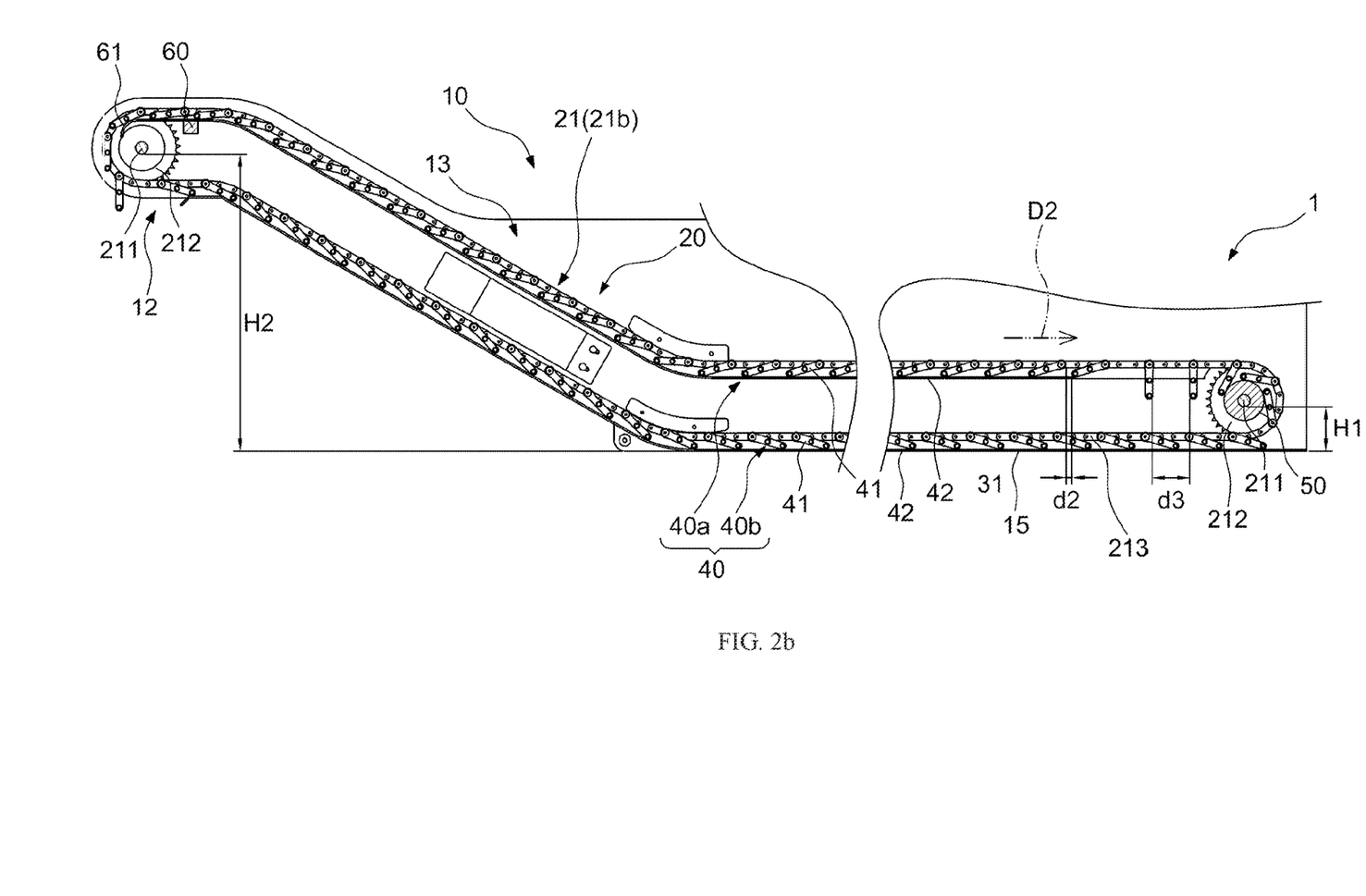
FIG. 2b is a local side cross-sectional view of a lower section of the cooking device for food according to the invention.

FIG. 1 is a three-dimensional appearance diagram of a cooking device for food according to the invention. FIG. 2a is a local side cross-sectional view of an upper section of the cooking device for food according to the invention. FIG. 2b is a local side cross-sectional view of a lower section of the cooking device for food according to the invention. Referring to FIG. 1, FIG. 2a and FIG. 2b, in an embodiment, according to the invention the cooking device 1 for food includes a base 10, a power unit 20, a pre-processing unit 30, and a multi-stage cooking unit 40. The cooking device 1 can be used for cooking food such as a chicken egg, a duck egg, a goose egg, or the like, but is not limited thereto.

The base 10 has an inlet end 11 and an outlet end 12, and an accommodating space 13 is formed between the inlet end 11 and the outlet end 12. In addition, a transmission direction D is defined between the inlet end 11 and the outlet end 12. A direction from the inlet end 11 to the outlet end 12 is defined as a first transmission direction D1, and a direction from the outlet end 12 to the inlet end 11 is defined as a second transmission direction D2. In an embodiment, the base 10 may include two opposite side portions 14 and a bottom portion 15. A distance exists between the two side portions 14, and the bottom portion 15 is located between the two side portions 14. The two side portions 14, together with the bottom portion 15, enclose the accommodating space 13, to connect with the power unit 20 and accommodate the pre-processing unit 30 and the multi-stage cooking unit 40.

The power unit 20 is connected to the base 10 and is located in the accommodating space 13. The power unit 20 includes a plurality of driving members 21, configured to drive the pre-processing unit 30 and the multi-stage cooking unit 40 to move forward in the transmission direction D, so that food can be transmitted from the inlet end 11 of the base 10 to the outlet end 12 of the base 10.

In an embodiment, the driving members 21 of the power unit 20 include a first driving member 21a and a second driving member 21b. The first driving member 21a and the second driving member 21b each include a plurality of rotation shafts 211, a plurality of sprockets 212, and a plurality of chains 213. The rotation shafts 211 are rotatably connected to the base 10 and are located in the accommodating space 13. When the base 10 includes the two side portions 14, the rotation shafts 211 are connected to the two side portions 14 of the base 10, and the rotation shafts 211 can be driven to rotate by a power source such as a motor. The sprockets 212 are connected to the rotation shafts 211 respectively, and the chains 213 are set around the sprockets 212. When the rotation shafts 211 are driven by the power source and synchronously drive the sprockets 212 to rotate, the chains 213 can be driven by the sprockets 212 to move around circularly in a clockwise direction or in an anticlockwise direction. Quantity selection and location setting of the rotation shafts 211, the sprockets 212, and the chains 213 of the driving members 21 are based on a principle that the pre-processing unit 30 and the multi-stage cooking unit 40 can be successfully driven to move forward along the transmission direction D, and are not limited by the embodiment disclosed above.

Figure 3:
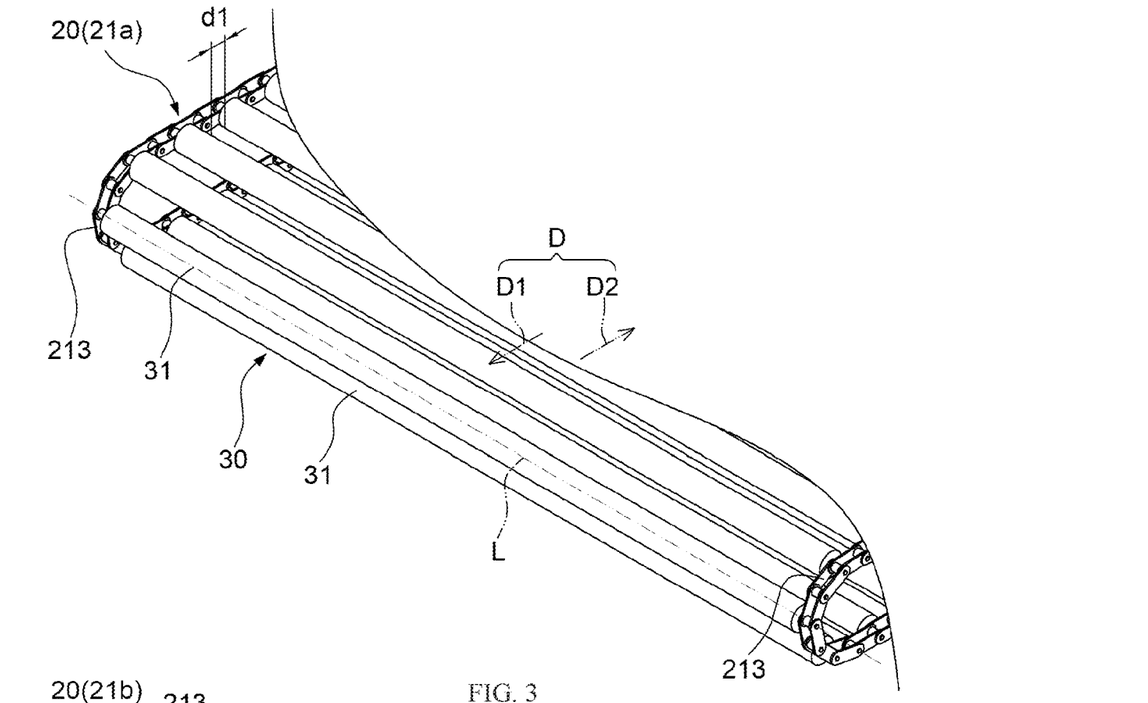
FIG. 3 is a local three-dimensional appearance diagram of a pre-processing unit of a cooking device for food according to the invention.

FIG. 3 is a local three-dimensional appearance diagram of a pre-processing unit of a cooking device for food according to the invention. Referring to FIG. 2a, FIG. 2b and FIG. 3, the pre-processing unit 30 includes a plurality of rollers 31 and at least one track 32. The rollers 31 are pivotally connected to the driving members 21 of the power unit 20, a locating spacing d1 exists between adjacent rollers 31, and each of the rollers 31 has a central axis L. An extension direction of the central axis L may be perpendicular to the transmission direction D. The at least one track 32 is connected to the base 10 and is located in the accommodating space 13, and the at least one track 32 may be in contact with a peripheral surface of the rollers 31.

In an embodiment, two opposite ends of the rollers 31 can be pivotally connected to the chains 213 of the first driving member 21a. A plurality of tracks 32 is provided, and the tracks 32 are respectively connected to the two side portions 14 of the base 10. Therefore, when the chains 213 of the first driving member 21a move circularly around the sprockets 212, the rollers 31 can correspondingly move towards the first transmission direction D1 or the second transmission direction D2. In addition, in the moving process, if the rollers 31 are in contact with the tracks 32, a frictional resistance between the rollers 31 and the tracks 32 enables the rollers 31 to rotate correspondingly.

Figure 4:
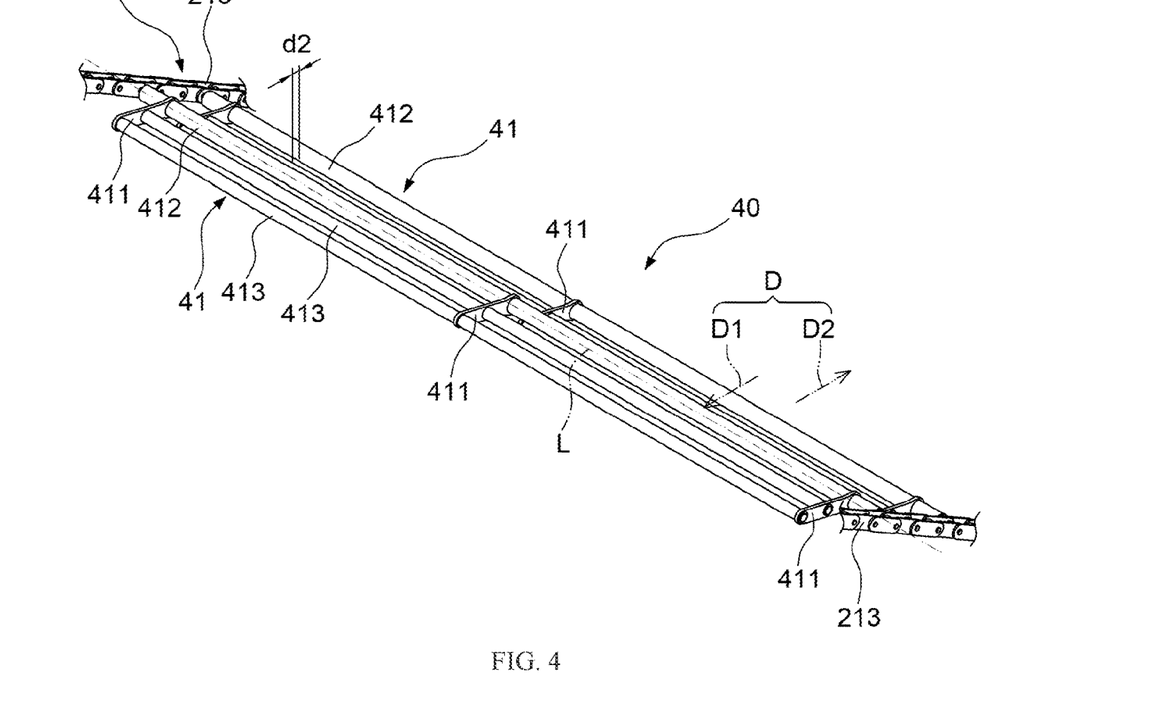
FIG. 4 is a local three-dimensional appearance diagram of a multi-stage cooking unit of a cooking device for food according to the invention.

FIG. 4 is a local three-dimensional appearance diagram of a multi-stage cooking unit of a cooking device for food according to the invention. Referring to FIG. 2a, FIG. 2b and FIG. 4, the multi-stage cooking unit 40 is disposed between the bottom portion 15 of the base 10 and the pre-processing unit 30, and the multi-stage cooking unit 40 may be divided into an upper layer 40a and a lower layer 40b. The upper layer 40a and the lower layer 40b of the multi-stage cooking unit 40 each include a plurality of stoppers 41 and at least one guideway 42. The stoppers 41 are pivotally connected to the driving members 21 of the power unit 20, and the at least one guideway 42 is connected to the base 10 and is located in the accommodating space 13. Therefore, when the driving members 21 drive the stoppers 41 to move forward, the at least one guideway 42 may be in contact with the stoppers 41, so that the stoppers 41 pivotally move to form a carrying spacing d2; or when the at least one guideway 42 is not in contact with the stoppers 41, the stoppers 41 pivotally move to form a blanking spacing d3.

In an embodiment, each of the stoppers 41 includes at least one fixing plate 411, a pivot joint rod 412, and at least one locating rod 413, where the quantity of the fixing plates 411 and the quantity of the locating rods 413 may be selected as one or more than two (included) as required. The fixing plate 411 is configured to fix the pivot joint rod 412 and the locating rod 413, so that the pivot joint rod 412 and the locating rod 413 are parallel to each other at intervals. Two opposite ends of the pivot joint rod 412 can be pivotally connected to the chains 213 of the second driving member 21b, and each of the pivot joint rods 412 has a central axis L, where an extension direction of the central axis L may be perpendicular to the transmission direction D. The at least one guideway 42 is jointed with the side portion 14 of the base 10. Therefore, when the chains 213 of the second driving member 21b move circularly around the sprockets 212, the stoppers 41 can correspondingly move towards the first transmission direction D1 or the second transmission direction D2. In addition, in the moving process of the stoppers 41, the at least one guideway 42 can be in contact with a peripheral surface of the at least one locating rod 413 of the stoppers 41.

Figure 5:
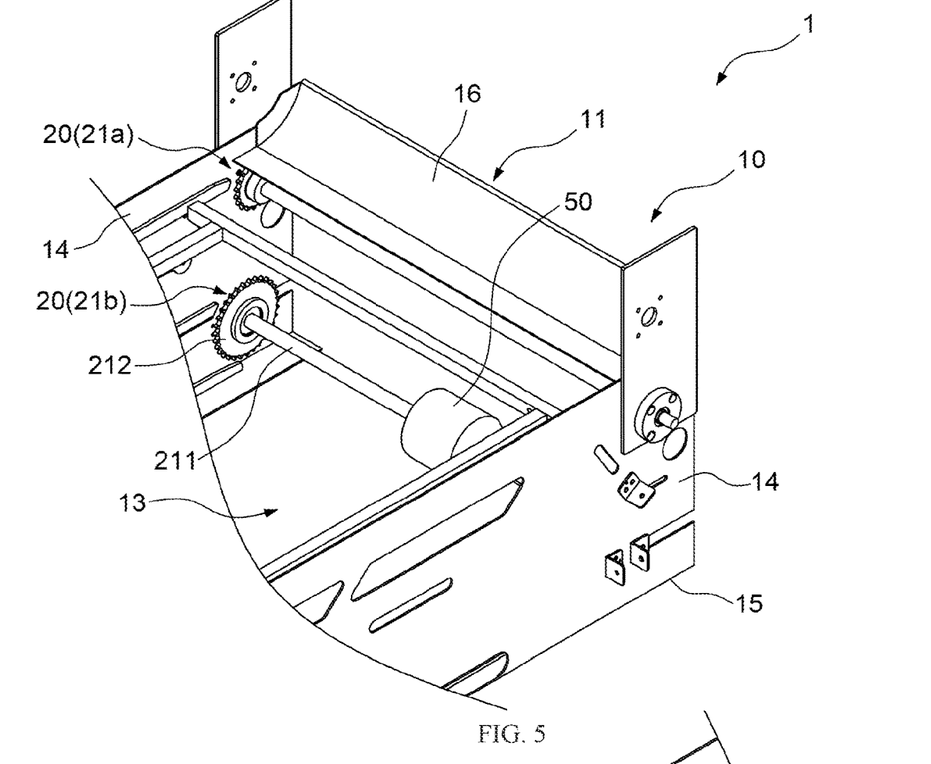
FIG. 5 is a local three-dimensional appearance diagram of a part near an inlet end of a base of a cooking device for food according to the invention.

FIG. 5 is a local three-dimensional appearance diagram of a part near an inlet end of a base of a cooking device for food according to the invention. In FIG. 5, the chains 213 and the stoppers 41 are not shown. Referring to FIG. 2a, FIG. 2b and FIG. 5, in an embodiment, the inlet end 11 of the base 10 is provided with a feeding plate 16, where the feeding plate 16 can carry food, to import the food to a location of the pre-processing unit 30. In addition, in the second driving member 21b of the power unit 20, one of the rotation shafts 211 that is near the inlet end 11 may be provided with a driving wheel 50, and the driving wheel 50 is configured to guide the stoppers 41 of the multi-stage cooking unit 40 to veer without interference and then move towards the first transmission direction D1.

Figure 6:
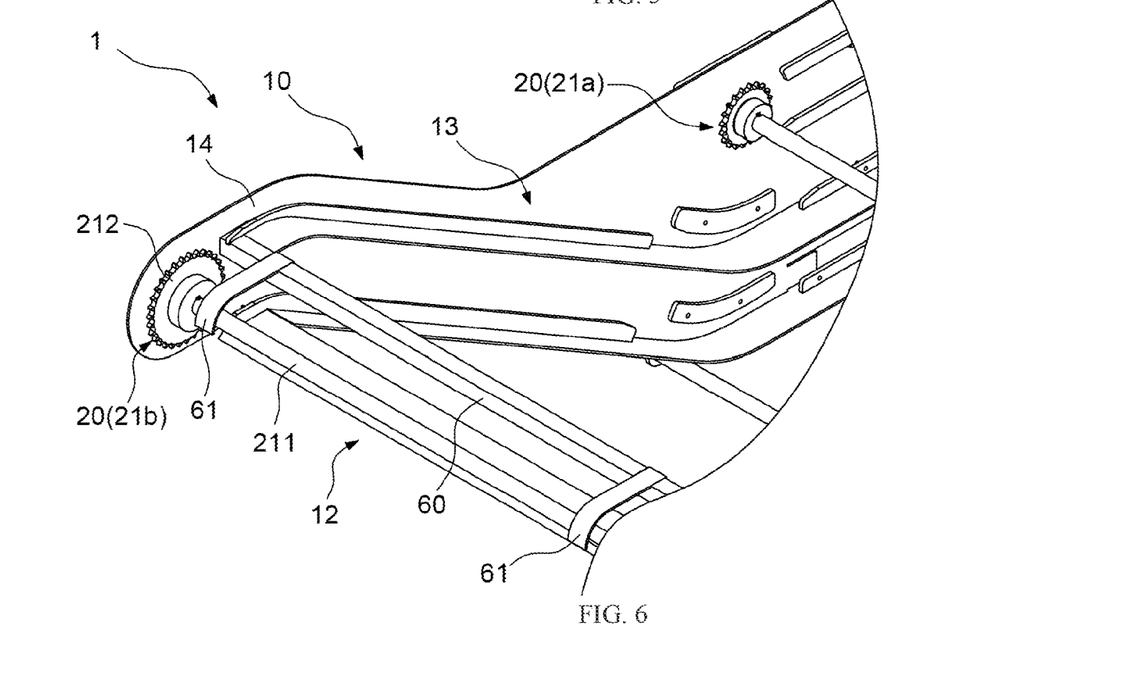
FIG. 6 is a local three-dimensional appearance diagram of a part near an outlet end of a base of a cooking device for food according to the invention.

FIG. 6 is a local three-dimensional appearance diagram of a part near an outlet end of a base of a cooking device for food according to the invention. In FIG. 6, the chains 213 and the stoppers 41 are not shown. Referring to FIG. 2a, FIG. 2b and FIG. 6, in an embodiment, the outlet end 12 of the base 10 is provided with a horizontal prism 60, where the horizontal prism 60 is jointed with a plurality of guiding plates 61. The location of the guiding plates 61 is set on the premise of not interfering with rotation of the rotation shafts 211. Therefore, the guiding plates 61 are configured to guide the stoppers 41 of the multi-stage cooking unit 40 to veer without interference and then move towards the second transmission direction D2.

Referring to FIG. 2a and FIG. 2b, in the second driving member 21b of the power unit 20, a first vertical height H1 exists between one of the rotation shafts 211 that is near the inlet end 11 and the bottom portion 15 of the base 10, a second vertical height H2 exists between another rotation shaft 211 that is near the outlet end 12 and the bottom portion 15 of the base 10, where the first vertical height H1 is less than the second vertical height H2. Therefore, with the bottom portion 15 of the base 10 as a reference, in the multi-stage cooking unit 40, the stoppers 41 near the outlet end 12 can be higher than the stoppers 41 near the inlet end 11, so that the food can be successfully output after being delivered to the outlet end 12.

When the cooking device 1 for food according to the invention is used for cooking food, heating may be achieved with water, vapor or hot blast in combination with methods such as heating from cold water, heating with boiled water or steam pressurizing, so that the food can be quickly cooked to be finished. The food being eggs is used as an example for description below.

Figure 7:
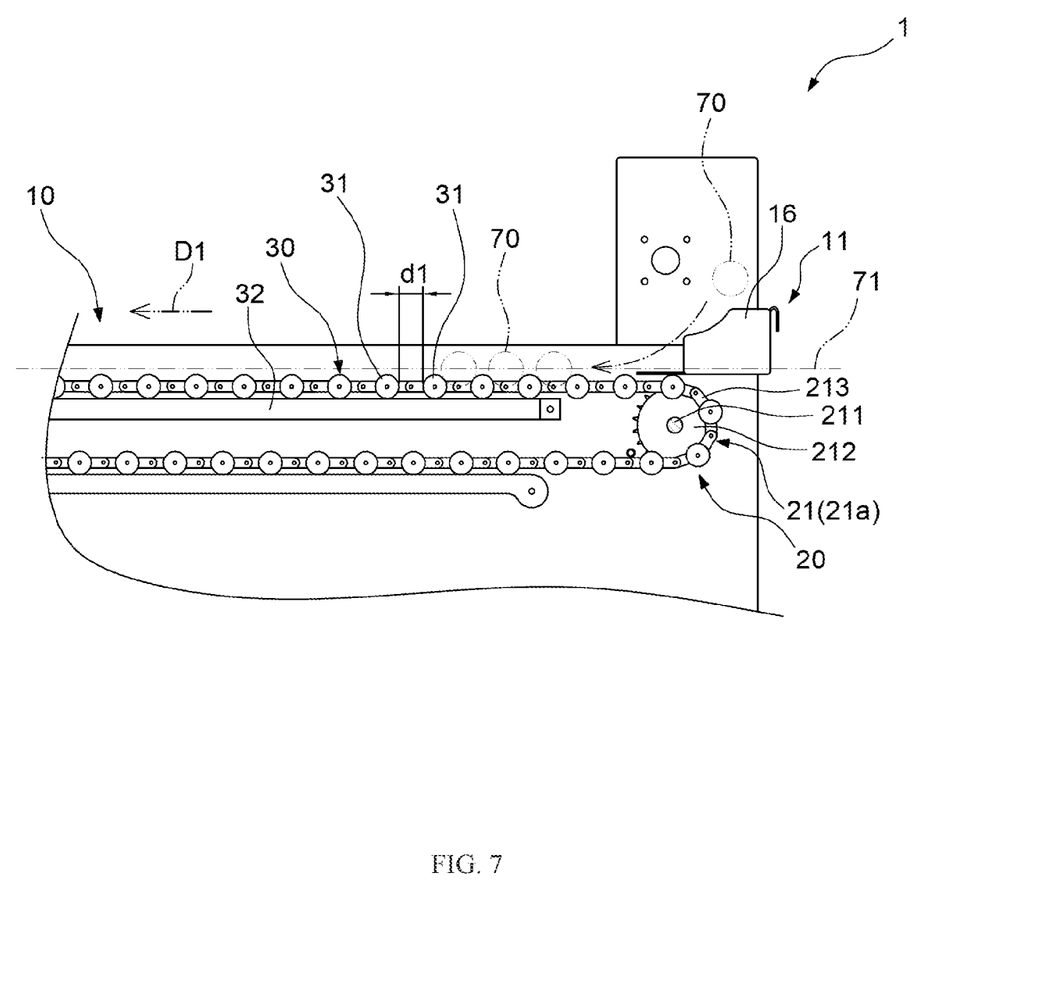
FIG. 7 is schematic diagram of a usage state of the cooking device for food according to the invention when food is put into the pre-processing unit.

FIG. 7 is schematic diagram of a usage state of the cooking device for food according to the invention when food is put into the pre-processing unit. Referring to FIG. 2a, FIG. 2b and FIG. 7, in an embodiment, a plurality of eggs 70 can be put into the feeding plate 16, and the feeding plate 16 can import the eggs 70 to the location of the pre-processing unit 30. The locating spacing d1 is set slightly less than an outer diameter of the egg 70, so that the eggs 70 can drop between the rollers 31 to be positioned at initial locations. The first driving member 21a of the power unit 20 can be driven, to control the chains 213 of the first driving member 21a to move circularly in an anticlockwise direction according to the direction shown in the figure. Therefore, the rollers 31, in cooperation with the first driving member 21a, can drive the eggs 70 to move towards the first transmission direction D1. In the moving process of the rollers 31, when the rollers 31 are in contact with the tracks 32 and rotate, the eggs 70 also correspondingly rotate synchronously between the rollers 31. In this case, if boiled water is used to heat the eggs 70, the boiled water is poured into the accommodating space 13 of the base 10, and a water surface 71 of the boiled water can be controlled at a central position of the eggs 70, so that the eggs 70 can be initially heated to be soft-boiled while continuously rolling and moving forward, and it is ensured that an internal yolk position is not easily eccentric. Further, the pre-processing unit 30 is applicable to initial heating processing of food such as eggs 70, to improve the quality of the food after being cooked. However, according to different characteristics of food to be processed, the assembly may also be omitted, that is, the food may be directed imported to the multi-stage cooking unit 40 for cooking.

Figure 8:
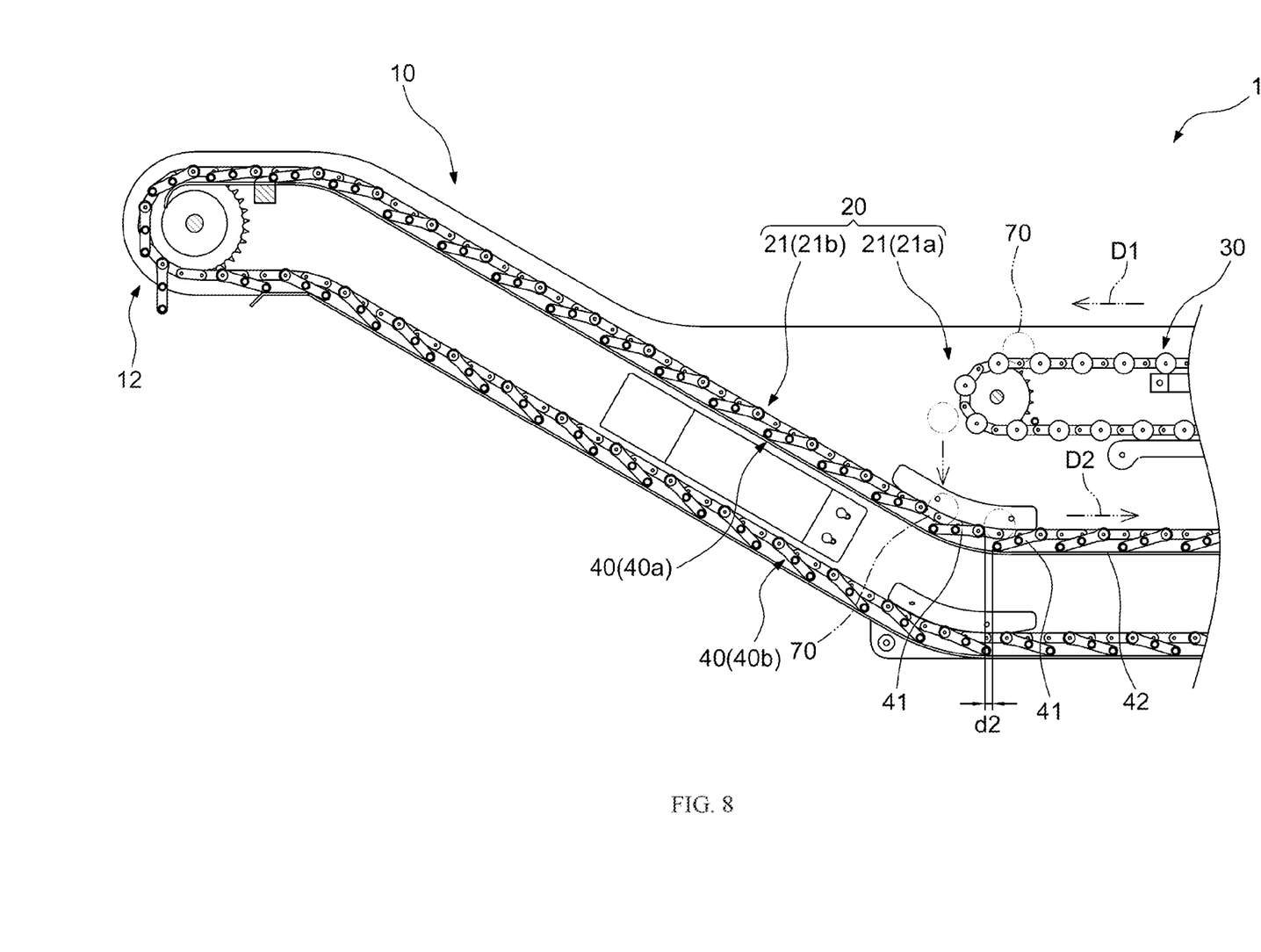
FIG. 8 is schematic diagram of a usage state of the cooking device for food according to the invention when food to be processed drop on an upper layer of the multi-stage cooking unit.

FIG. 8 is schematic diagram of a usage state of the cooking device for food according to the invention when food to be processed drop on an upper layer of the multi-stage cooking unit. Referring to FIG. 2a, FIG. 2b and FIG. 8, in an embodiment, when the rollers 31 drive the eggs 70 to keep moving towards the first transmission direction D1 to an end, the egg 70 that has been cooked for a while can drop in flow with water to the upper layer 40a of the multi-stage cooking unit 40. The second driving member 21b of the power unit 20 can be driven, to control the chains 213 of the second driving member 21b to move circularly in a clockwise direction according to the direction shown in the figure. Therefore, the stoppers 41 of the upper layer 40a, in cooperation with the second driving member 21b, can drive the eggs 70 to move towards the second transmission direction D2. In the moving process of the stoppers 41, when in contact with the guideways 42, the stoppers 41 are pivotally inclined, so that the carrying spacing d2 is formed between the stoppers 41. The carrying spacing d2 may be set slightly less than the outer diameter of the egg 70, to ensure that the eggs 70 are positioned between the stoppers 41, thereby being steadily and continuously cooked in the water and moving towards the second transmission direction D2. To describe and clearly present the position where the egg 70 is placed, in FIG. 8, only one egg 70 presented between the stoppers 41. In an embodiment, several eggs 70 are stacked between the stoppers 41.

Figure 9:
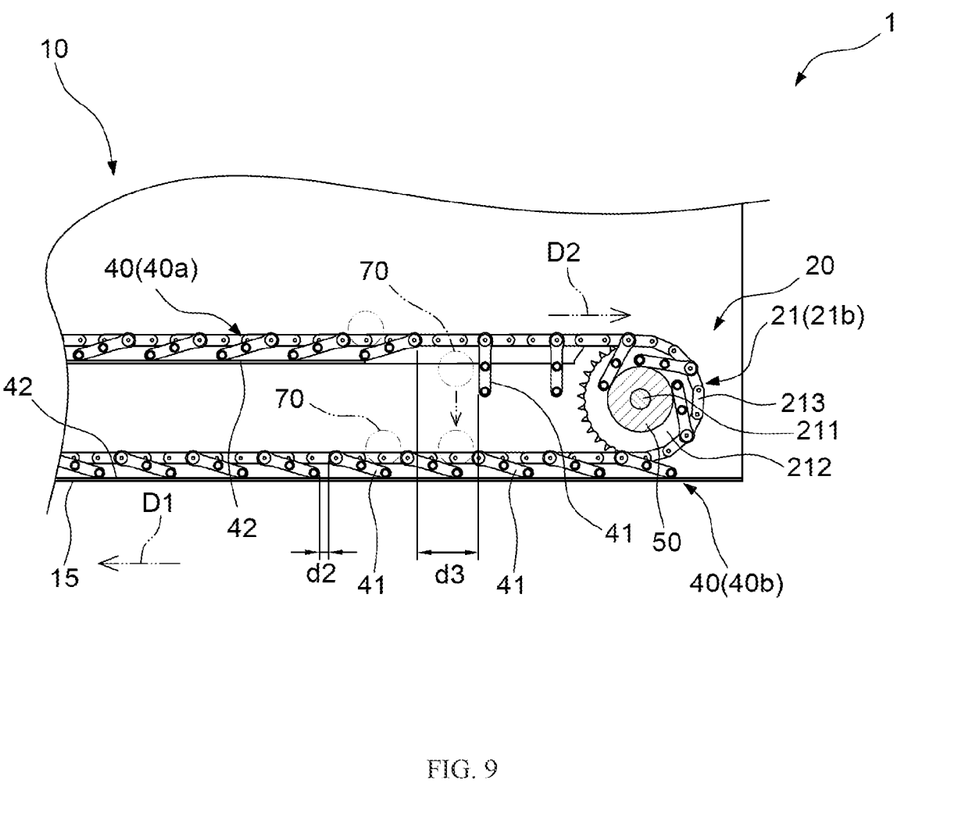
FIG. 9 is schematic diagram of a usage state of the cooking device for food according to the invention when food to be processed drop on a lower layer of the multi-stage cooking unit.

FIG. 9 is schematic diagram of a usage state of the cooking device for food according to the invention when food to be processed drop on a lower layer of the multi-stage cooking unit. Referring to FIG. 2a, FIG. 2b and FIG. 9, in an embodiment, the stoppers 41 drive the eggs 70 to keep moving towards the second transmission direction D2 to an end, and when the stoppers 41 are out of contact with the guideways 42, the stoppers 41 are pivotally vertical, so that the blanking spacing d3 is formed between the stoppers 41, and the blanking spacing d3 is set greater than the outer diameter of the egg 70. That is, in a set distance in front of the driving wheel 50, the guideways 42 are not provided, so that in the set distance where the guideways 42 are not provided, the stoppers 41 are pivotally vertical, thereby forming the blanking spacing d3 between the stoppers 41. Therefore, the egg 70 that has been cooked for a while can drop in flow with water to the lower layer 40b of the multi-stage cooking unit 40. Therefore, the stoppers 41 of the lower layer 40b, in cooperation with the second driving member 21b, can continuously drive the eggs 70 to move towards the first transmission direction D1. In the moving process of the stoppers 41, when in contact with the guideways 42 or the bottom portion 15 of the base 10, the stoppers 41 are also pivotally inclined, so that the carrying spacing d2 is formed between the stoppers 41, to ensure that the eggs 70 are positioned between the stoppers 41, thereby being steadily and continuously cooked in the water and moving towards the first transmission direction D1.

Figure 10:
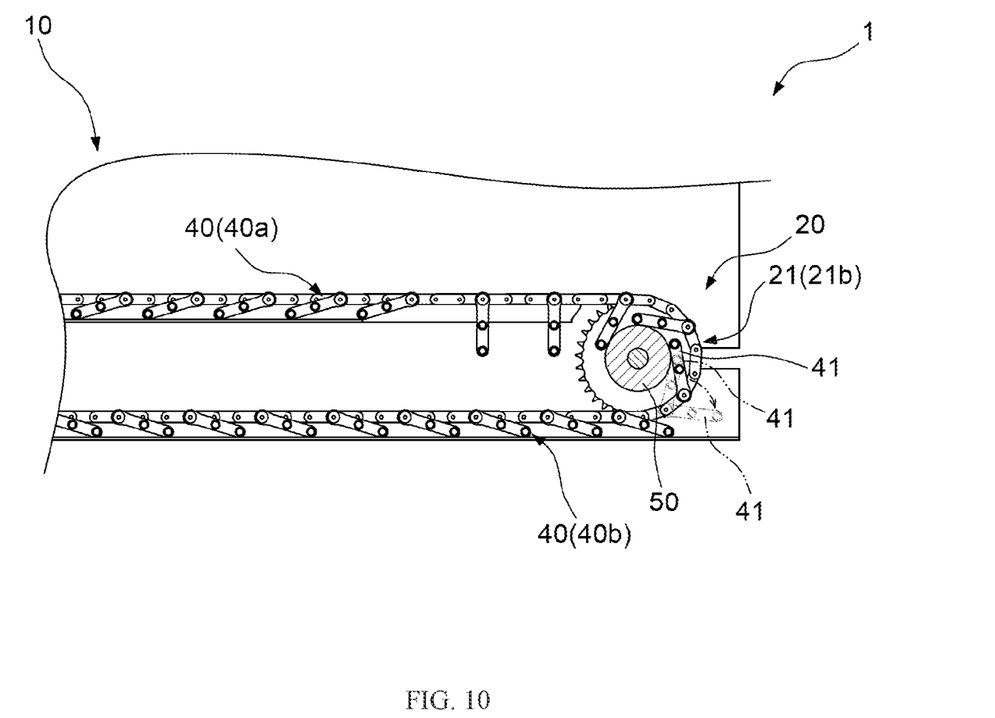
FIG. 10 is schematic diagram of a usage state of the cooking device for food according to the invention when stoppers of the multi-stage cooking unit veer.

FIG. 10 is schematic diagram of a usage state of the cooking device for food according to the invention when stoppers of the multi-stage cooking unit veer. Referring to FIG. 10, the driving wheel 50 can guide the stoppers 41 of the upper layer 40a of the multi-stage cooking unit 40 to veer towards the lower layer 40b of the multi-stage cooking unit 40 without interference, and then continuously move towards the first transmission direction D1. Therefore, the cooking device 1 for food can be ensured to operate more smoothly, to improve working stability.

Figure 11:
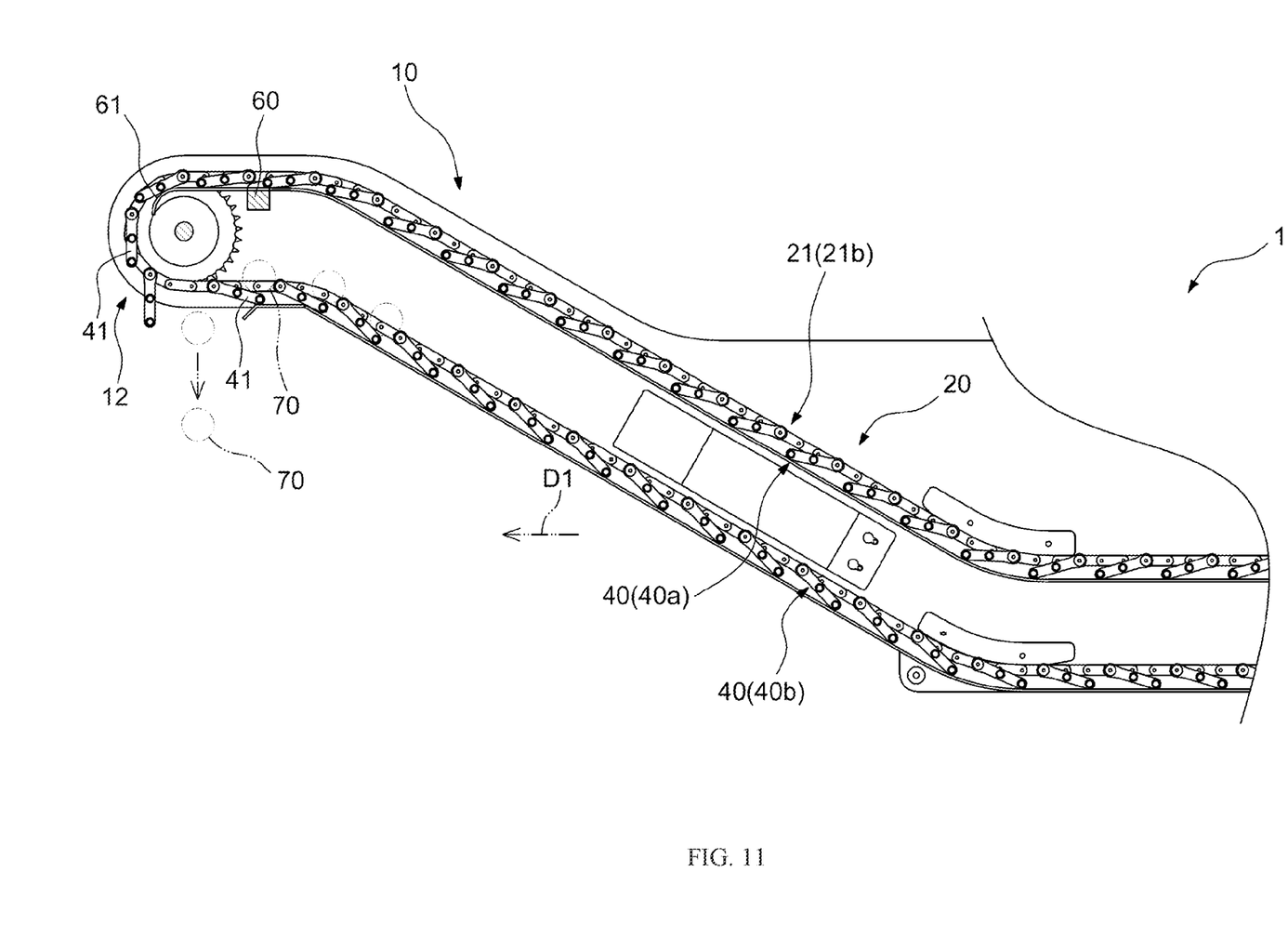
FIG. 11 is schematic diagram of a usage state of the cooking device for food according to the invention when food to be processed finishes cooking and is output.

FIG. 11 is schematic diagram of a usage state of the cooking device for food according to the invention when food to be processed finishes cooking and is output. Referring to FIG. 11, in an embodiment, the stoppers 41 can drive the eggs 70 that have been cooked for a while to keep moving towards the first transmission direction D1 to the outlet end 12. When moving to a position near the outlet end 12 of the multi-stage cooking unit 40, the eggs 70 can be directly output through the outlet end 12 and drop on a scheduled collection position, to complete cooking of the eggs 70. In addition, the guiding plate 61 is provided, and the guiding plate 61 can guide the stoppers 41 of the lower layer 40b of the multi-stage cooking unit 40 to veer towards the upper layer 40a of the multi-stage cooking unit 40 without interference. Therefore, it is ensured that the pre-processing unit 30 and the multi-stage cooking unit 40 of the cooking device 1 for food continuously move circularly, to repeatedly perform the foregoing cooking steps, so that a large quantity of food can be cooked to improve cooking efficiency.

As described above, in the foregoing embodiments, in the process that the cooking device 1 for food of the invention uses the pre-processing unit 30 and the multi-stage cooking unit 40 to cook food, the food, for example, food that is easily cracked like eggs, may be arranged at intervals, to effectively prevent each of the eggs from being cracked due to squeeze. In addition, because the multi-stage cooking unit 40 can be divided into the stoppers 41 of the upper layer 40a and the stoppers 41 of the lower layer 40b, by using the hierarchical design, an overall length of the cooking device 1 for food is reduced to avoid occupying too much space of the workshop, thereby improving use convenience. Further, the cooking device 1 for food of the invention can be used to cook a large quantity of food, to supply a huge market demand of the catering industry and reduce a waste of human resources, thereby saving working time. Further, the multi-stage cooking unit 40 can steadily drive food to keep moving, so that the food has enough time to be fully cooked evenly, to improve the cooking quality of the food.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized in accordance with some embodiments of the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. A cooking device for eggs, comprising:
a base, having an inlet end and an outlet end, and an accommodating space formed between the inlet end and the outlet end, a transmission direction defined between the inlet end and the outlet end, wherein a direction from the inlet end to the outlet end is defined as a first transmission direction, and a direction from the outlet end to the inlet end is defined as a second transmission direction;
a power unit, connected to the base, the power unit having a first driving member and a second driving member, the first driving member and the second driving member each having a plurality of rotation shafts, a plurality of sprockets, and a plurality of chains, the rotation shafts rotatably connected to the base and located in the accommodating space, the sprockets connected to the rotation shafts respectively, and the chains mounted around the sprockets, a first vertical height existing between one of the rotation shafts that is near the inlet end and a bottom portion of the base, a second vertical height existing between another rotation shaft that is near the outlet end and the bottom portion of the base, wherein the first vertical height is less than the second vertical height; and
a multi-stage cooking unit, divided into an upper layer and a lower layer, the multi-stage cooking unit having a plurality of stoppers and at least one guideway, each of the stoppers pivotally connected to the plurality of chains of the second driving member of the power unit through a pivot joint rod, the stoppers of the upper layer driven by the second driving member to move towards the second transmission direction, the stoppers of the lower layer driven by the second driving member to move towards the first transmission direction, and the at least one guideway connected to the base, wherein the stoppers pivotally move to form a carrying spacing or a blanking spacing, the stoppers comprises a first stopper and a second stopper adjacent to the first stopper, the carrying spacing is between an end portion of the first stopper and the pivot joint rod of the second stopper, and is less than an outer diameter of eggs, the blanking spacing is between the pivot joint rod of the first stopper and the pivot joint rod of the second stopper, and is greater than the outer diameter of the eggs, and near the outlet end the stoppers pivotally move to output the cooked eggs;

wherein heating eggs is achieved by boiled water poured into said accommodating space.

2. The cooking device for eggs of claim 1, wherein the base comprises two opposite side portions and a bottom portion, a distance exists between the two side portions, and the bottom portion is located between the two side portions, the two side portions together with the bottom portion enclose the accommodating space.

3. The cooking device for eggs of claim 2, wherein the rotation shafts are connected to the two side portions of the base.

4. The cooking device for eggs of claim 1, wherein each of the stoppers comprises at least one fixing plate, the pivot joint rod, and at least one locating rod, the fixing plate is configured to fix the pivot joint rod and the locating rod, the pivot joint rod and the locating rod are parallel to each other at intervals, two opposite ends of the pivot joint rod are pivotally connected to the chains of the second driving member.

5. The cooking device for eggs of claim 4, wherein each of the pivot joint rods has a central axis, an extension direction of the central axis is perpendicular to the transmission direction.

6. The cooking device for eggs of claim 1, further comprising a pre-processing unit having a plurality of rollers and at least one track, wherein the rollers are pivotally connected to the driving members of the power unit, a locating spacing exists between adjacent rollers, the at least one track is connected to the base and is located in the accommodating space.

7. The cooking device for eggs of claim 6, wherein two opposite ends of the rollers is pivotally connected to the chains of the first driving member.

8. The cooking device for eggs of claim 6, wherein each of the rollers has a central axis, an extension direction of the central axis is perpendicular to the transmission direction.

9. The cooking device for eggs of claim 2, wherein the at least one guideway is jointed with the side portion of the base.

10. The cooking device for eggs of claim 1, wherein in the second driving member of the power unit, one of the rotation shafts that is near the inlet end is provided with a driving wheel.

11. The cooking device for eggs of claim 1, wherein the outlet end of the base is provided with a horizontal prism, the horizontal prism is jointed with a plurality of guiding plates.

12. The cooking device for eggs of claim 1, wherein the inlet end of the base is provided with a feeding plate.

* * * * *